United States Patent
Hirobe et al.

(10) Patent No.: US 12,194,866 B2
(45) Date of Patent: Jan. 14, 2025

(54) POWER CUTOFF DEVICE

(71) Applicant: Panasonic Intellectual Property Management Co., Ltd., Osaka (JP)

(72) Inventors: Takashi Hirobe, Osaka (JP); Tatsuya Okamoto, Osaka (JP); Shun Kazama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 494 days.

(21) Appl. No.: 17/618,799

(22) PCT Filed: May 13, 2020

(86) PCT No.: PCT/JP2020/019155
§ 371 (c)(1),
(2) Date: Dec. 13, 2021

(87) PCT Pub. No.: WO2021/010007
PCT Pub. Date: Jan. 21, 2021

(65) Prior Publication Data
US 2022/0250481 A1    Aug. 11, 2022

(30) Foreign Application Priority Data
Jul. 17, 2019   (JP) ................................. 2019-131530

(51) Int. Cl.
*B60L 3/00*     (2019.01)
*B60L 3/04*     (2006.01)
(Continued)

(52) U.S. Cl.
CPC ............... *B60L 3/04* (2013.01); *H02H 3/087* (2013.01); *H02H 3/093* (2013.01); *H02H 7/18* (2013.01)

(58) Field of Classification Search
CPC .......... B60L 3/04; H02H 3/087; H02H 3/093; H02H 7/18
(Continued)

(56) References Cited

U.S. PATENT DOCUMENTS

2017/0371392 A1*  12/2017  Banerjee ................. G06F 1/305
2018/0236888 A1*  8/2018   Yabuuchi .............. H01M 10/44
(Continued)

FOREIGN PATENT DOCUMENTS

CN        106483846 A    3/2017
JP        8-251907 A     9/1996
(Continued)

OTHER PUBLICATIONS

English Translation for KR101996510B1 (Year: 2024).*
(Continued)

*Primary Examiner* — Mahmoud S Ismail
(74) *Attorney, Agent, or Firm* — WHDA, LLP

(57) ABSTRACT

A power cutoff device includes a relay unit including a switch having a connecting state and a cutoff state, a cutoff unit connected in series to the switch, a current detector to detect an object current flowing through the cutoff unit, and a controller to control the relay unit and the cutoff unit. The cutoff unit has a connecting state and an irreversible cutoff state. The controller obtains a changing rate of the object current with respect to time. The controller causes the switch to be in the connecting state and causes the cutoff unit to be in the connecting state if determining that the changing rate is not greater than a changing-rate threshold. The controller causes the relay unit to be in the cutoff state and cause the cutoff unit to be in the irreversible cutoff state if determining that the changing rate is greater than the changing-rate threshold.

20 Claims, 6 Drawing Sheets

(51) Int. Cl.
  *H02H 3/00*    (2006.01)
  *H02H 3/087*   (2006.01)
  *H02H 3/093*   (2006.01)
  *H02H 7/18*    (2006.01)

(58) Field of Classification Search
  USPC .............................................................. 701/1
  See application file for complete search history.

(56) References Cited

U.S. PATENT DOCUMENTS

2019/0013168 A1\*  1/2019  Waag ..................... H01H 89/00
2019/0296541 A1\*  9/2019  Mensch ................... B60L 3/04

FOREIGN PATENT DOCUMENTS

| JP | 2011-223655 | 11/2011 |
| KR | 10-2018-096985 A | 8/2018 |
| KR | 101996510 B1 \* | 7/2019 |

OTHER PUBLICATIONS

International Search Report of PCT application No. PCT/JP2020/019155 dated Jul. 7, 2020.
The Extended European Search Report dated Aug. 11, 2022, issued in counterpart EP Application No. 20839814.9. (7 pages).

\* cited by examiner

POWER CUTOFF DEVICE

CROSS-REFERENCE TO RELATED APPLICATIONS

This application is a national stage application, filed under 35 U.S.C. § 371, of International Patent Application No. PCT/JP2020/019155, filed on May 13, 2020, which claims the benefit of Japanese Patent Application No. 2019-131530, filed on Jul. 17, 2019, the entire contents of each of which is herein incorporated by reference.

TECHNICAL FIELD

The present invention relates to a power cutoff device usable in various vehicles.

BACKGROUND ART

In a conventional cutoff device, an ordinary thermal fuse and a relay are connected in a power path between a storage battery and a vehicle driving load. When abnormally large current flows through the power path or when a collision of the vehicle is detected, the fuse is blown out by heat generated by the current and the relay is switched to a cutoff state to cut off electrical connection between the storage battery and the vehicle driving load.

PTL 1 discloses a conventional cutoff device similar to the cutoff device described above.

CITATION LIST

Patent Literature

PTL 1: Japanese Patent Laid-Open Publication No. 2011-223655

SUMMARY

A power cutoff device includes a relay unit including a switch having a connecting state to be electrically conductive and a cutoff state to be electrically non-conductive, a cutoff unit connected in series to the switch, a current detector configured to detect an object current flowing through the cutoff unit, and a controller configured to control the relay unit and the cutoff unit. The cutoff unit has a connecting state to be electrically conductive and an irreversible cutoff state to be electrically conductive. The controller is configured to obtain a changing rate of the object current with respect to time. The controller is configured to cause the switch to be in the connecting state and cause the cutoff unit to be in the connecting state if determining that the changing rate is not greater than a changing-rate threshold. The controller is configured to cause the relay unit to be in the cutoff state and cause the cutoff unit to be in the irreversible cutoff state if determining that the changing rate is greater than the changing-rate threshold.

This power cutoff device has a small size.

DETAIL DESCRIPTION OF PREFERRED EMBODIMENTS

Figure 1:
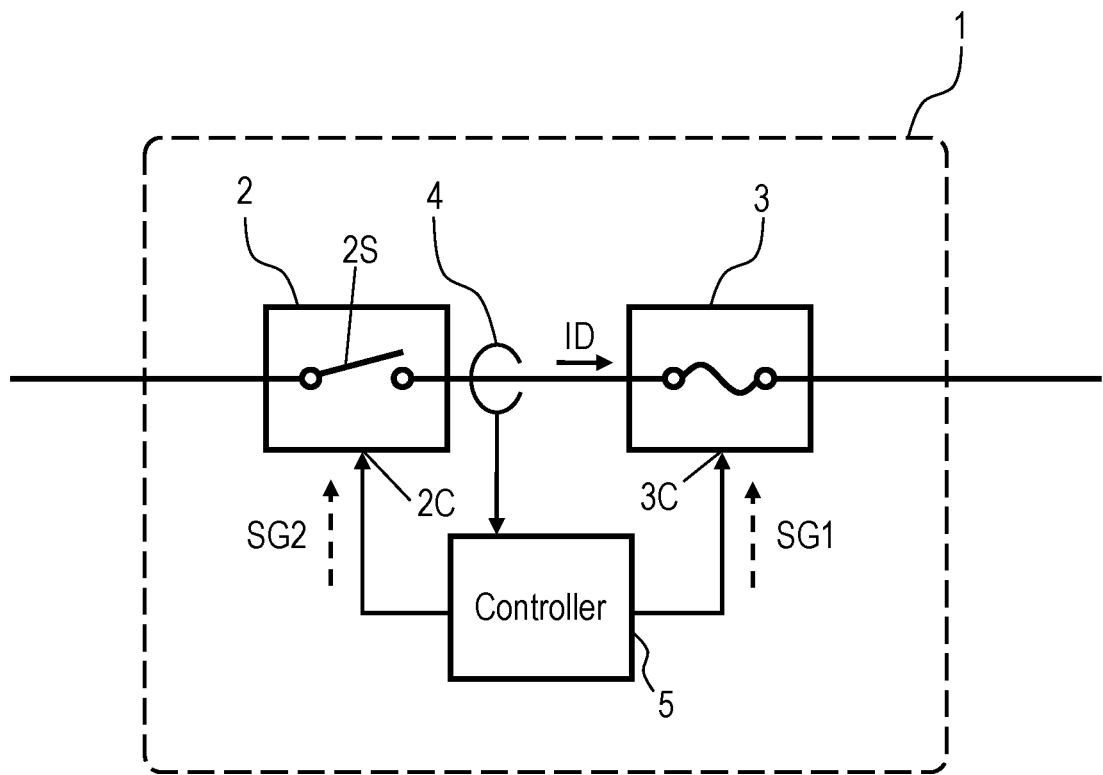
FIG. 1 is a circuit block diagram of a power cutoff device in accordance with an exemplary embodiment.

FIG. 1 is a circuit block diagram of a power cutoff device in accordance with an exemplary embodiment. Power cutoff device 1 includes relay unit 2, cutoff unit 3, current detector 4, and controller 5. Relay unit 2 is connected in series with cutoff unit 3. Current detector 4 is configured to detect object current ID flowing through cutoff unit 3 in each of detection periods. Current detector 4 is connected to controller 5. Controller 5 is configured to control the opening and closing operations of relay unit 2 and cutoff unit 3.

Upon receiving cutoff signal SG1 transmitted from controller 5, cutoff unit 3 is switched from a connecting state to an irreversible cutoff state. Upon receiving cutoff signal SG2 transmitted from controller 5, relay unit 2 is switched from a connecting state to a cutoff state. Cutoff signals SG1 and SG2 are supplied when controller 5 determines that the changing rate of object current ID in a detection period is greater than changing-rate threshold CT.

The configuration described above allows controller 5 to determine that object current ID has e a large value at an early stage of a transition period in which object current ID flowing through relay unit 2 and cutoff unit 3 changes from a permissible value to a large value. Before object current ID has a large value, relay unit 2 and cutoff unit 3 are switched from the connecting state to the cutoff state.

This operation allows relay unit 2 and cutoff unit 3 to be in the cutoff state at a stage before object current ID in relay unit 2 reaches an excessively large value, thus preventing an arc generated at a contact of relay unit 2, and preventing an incomplete cutoff state that results from the occurrence of the arc. Since object current ID is cut off before reaching a large value, relay unit 2 may not necessarily have a large size in order to ensure sufficient operation reliability of relay unit 2, and as a result, power cutoff device 1 has a small size.

The conventional cutoff device described above requires a very large current to flow through it in order to blow the fuse and cut off electric power in a short time. In order to operate a relay properly in a condition where a large current flows such that the fuse is blown out in a short time, the relay necessarily has a large current capacity. If a current larger than a threshold value flows through the relay in the case where the current capacity of the relay is small, the relay may not be in the cutoff state and continuously conductive due of an arc discharge occurring between contacts of the relay, hence damaging the relay. Consequently, the operation reliability of the cutoff device may be lowered. For this reason, it is inevitable that the size of the relay be large in order to improve the reliability of the cutoff operation of the cutoff device.

In contrast, power cutoff device 1 according to the embodiment reduces its size, as described above.

Figure 2:
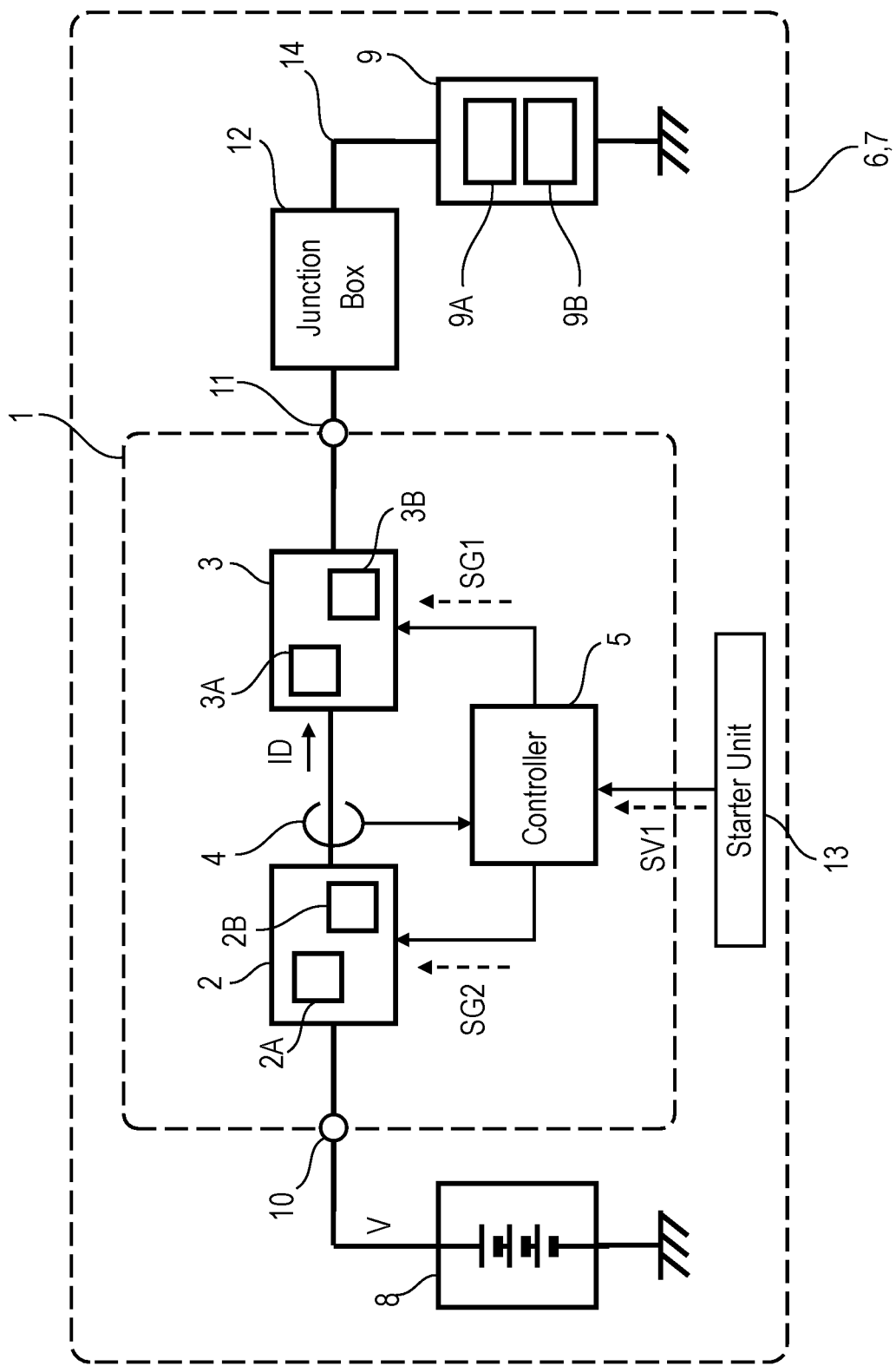
FIG. 2 is a circuit block diagram of a vehicle having the power cutoff device in accordance with the embodiment mounted thereto.
Figure 3:
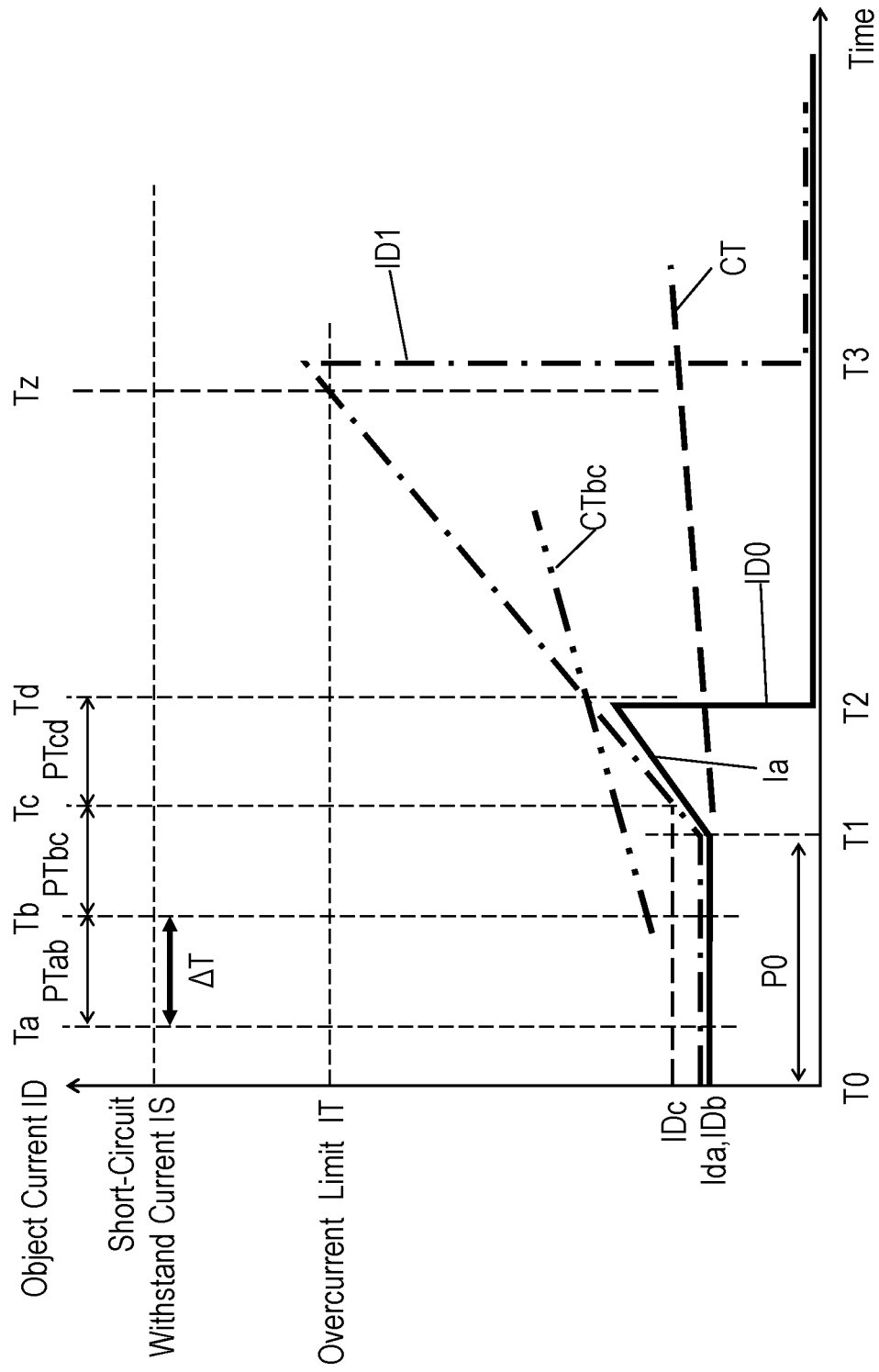
FIG. 3 shows operation characteristics of the power cutoff device in accordance with the embodiment.

The configuration and operation of power cutoff device 1 will be detailed below. FIG. 2 is a circuit block diagram of vehicle 6 having power cutoff device 1 mounted thereto. FIG. 3 shows an operation characteristics of power cutoff device 1.

Power cutoff device 1 is installed to in vehicle 6 which uses electric power for propulsion driving. Power cutoff device 1 is mounted to vehicle body 7 of vehicle 6. High voltage battery 8 and driving load 9 are also mounted to vehicle body 7. High voltage battery 8 is connected to input terminal 10 of power cutoff device 1. Driving load 9 is connected to output terminal 11 of power cutoff device 1 via junction box 12. Power cutoff device 1 is installed to vehicle 6, but power cutoff device 1 may constitutes a power cutoff system together with high voltage battery 8 and driving load 9.

Since vehicle 6 utilizes electric power for propulsion driving, as mentioned above, high voltage battery 8 is a secondary battery having a direct-current (DC) high voltage of about several hundred volts to about 1000 volts. Driving load 9 includes power converter 9A, such as an inverter, and driving motor 9B. Junction box 12 is configured to distribute electric power from high voltage battery 8 to other loads in addition to driving load 9 to allow electric power to be supplied thereto.

Relay unit 2 includes switch 2S. Switch 2S is configured to be in a connecting state in which the switch is electrically conductive and a cutoff state in which the switch is electrically non-conductive. Relay unit 2 includes control terminal 2C. Switch 2S is in the connecting state upon not receiving cutoff signal SG2 at control terminal 2C. Switch 2S is in the cutoff state upon receiving cutoff signal SG2 at control terminal 2C. Cutoff unit 3 includes breaker 3A connected in series to switch 2S of relay unit 2. Breaker 3A is configured to be in a connecting state in which the breaker is electrically conductive and in an irreversible cutoff state in which the breaker is electrically non-conductive irreversibly. Cutoff unit 3 includes control terminal 3C. Breaker 3A is normally in the connecting state. Breaker 3A is in the irreversible cutoff state when cutoff signal SG1 is received at control terminal 3C. Current detector 4 is configured to detect object current ID flowing through breaker 3A of cutoff unit 3.

Vehicle 6 starts to be driven when a driver activates starter unit 13. Upon being activated by the driver, starter unit 13 transmits start signal SV1 to controller 5. Upon receiving start signal SV1, controller 5 causes relay unit 2 to be in the connecting state. Relay unit 2 may include electromagnetic relay 2A including switch 2S implemented by a mechanical contact, and relay circuit 2B for turning on and off electromagnetic relay 2A. The relay may be implemented by a semiconductor switch in place of the electromagnetic relay.

Cutoff unit 3 is continuously in the connecting state before vehicle 6 is started. Breaker 3A of cutoff unit 3 performs a cutoff operation in response to a cutoff signal received from outside like a pyro igniter. After that, the breaker in the cutoff operation is continuously in the irreversible cutoff state that does not return to the connecting state. Controller 5 may include cutoff circuit 3B for cutting off breaker 3A.

In the case that breaker 3A of cutoff unit 3 is implemented by a pyro igniter, cutoff circuit 3B receives cutoff signal SG1 emitted from controller 5 at control terminal 3C to ignite a pyrotechnic part of the pyro igniter of breaker 3A. Then, energy generated by igniting and exploding the pyrotechnic part of breaker 3A causes a conductive part of cutoff unit 3 to destruct, and causes cutoff unit 3 to be in the cutoff state.

Alternatively, in the case that breaker 3A is implemented by a thermal fuse configured to blow out due to Joule heat produced by object current ID, cutoff circuit 3B supplies redundant current to breaker 3A upon receiving cutoff signal SG1.

In other words, cutoff unit 3 employs an active fuse. Or, cutoff unit 3 operates as an active fuse as a whole.

States and operations of power cutoff device 1 will be described below. FIG. 3 shows an operation characteristics of power cutoff device 1. In FIG. 3, the vertical axis represents object current ID flowing through breaker 3A of cutoff unit 3, and the horizontal axis represents time. FIG. 3 shows object current ID0 of power cutoff device 1 in accordance with the embodiment. FIG. 3 also shows object current ID1 of a comparative example of a power cutoff device configured to detect that object current ID exceeds overcurrent limit IT so as to cut off a cutoff unit thereof. FIG. 3 shows changing-rate threshold CT denoted by a straight dashed line. Overcurrent limit IT is set to a current that flows when short-circuit occurs in vehicle 6 or vehicle body 7. Alternatively, overcurrent limit IT may be set to a lower limit value of a current that flows when short-circuit occurs in vehicle 6 or vehicle body 7, particularly when short-circuit related to high voltage battery 8 occurs.

Current detector 4 may be implemented by a Hall element or a shunt resistor as a current detecting element. Current detector 4 is configured to detect a current value of object current ID flowing through breaker 3A of cutoff unit 3 and switch 2S of relay unit 2, and to transmit to controller 5 an electric signal corresponding to the detected current value. In this example, current detector 4 is connected between relay unit 2 and cutoff unit 3. Current detector 4 may be connected between relay unit 2 and input terminal 10. Alternatively, current detector 4 may be connected between cutoff unit 3 and output terminal 11.

When a driver operates starter unit 13 at timing T0 in the operation characteristic diagram of FIG. 3, vehicle 6 starts to be driven. After that, a short-circuit current is generated at timing T1. In steady period PT0 from timing T0 to timing T1, vehicle 6 and power cutoff device 1 are in a steady state, and object currents ID and ID1 detected by current detector 4 both have steady value Ic, or a value that fluctuates within a permissible range above and below steady value Ic.

In steady period PT0, object currents ID and ID1 have both steady values Ic and indicated by straight lines in FIG. 3. Although the currents are in a steady state, the electric power consumed by driving load 9 actually fluctuates constantly, so that steady value Ic may result in a pulsating flow. On the other hand, although steady value Ic is a pulsating flow, a large gap exists between steady value Ic and overcurrent limit IT which is a trigger for the cutoff operation of power cutoff device 1 when an abnormal current, such as a short-circuit current, flows through power cutoff device 1. Difference Ivn between the local maximum value and the local minimum value of the pulsating flow to have steady value Ic is much smaller than the difference between steady value Ic and overcurrent limit IT. The change of the pulsating current having steady value Ic from the local maximum value to the local minimum value occurs more slowly than the change of the current when a short-circuit current occurs.

When vehicle 6 starts to be driven, current detector 4 starts to detect object current ID and controller 5 starts calculations on object current ID. The detection of object current ID, the calculation on object current ID, and comparison and determination of the calculation results with changing-rate threshold CT are executed for each of plurality of detection periods each having a predetermined length ΔT. In other words, the controller converts the amount of change of value IDb of object current ID detected at timing Tb from value IDa of object current ID detected at timing Ta by calculation into changing rate CTab which is the amount of change of the object current per unit time over detection period PTab from timing Ta to timing Tb. The controller compares changing rate CTab with changing-rate threshold CT. Similarly, the controller converts the amount of change of value IDc of object current ID detected at timing Tc from value IDb of object current ID by calculation into changing rate CTbc over detection period PTbc from timing Tb to timing Tc. The controller compares changing rate CTbc with changing-rate threshold CT. The controller converts the amount of change of value IDd of object current ID detected at timing Td from value IDc of object current ID by calculation into changing rate CTcd over detection period PTcd from timing Tb to timing Tc. The controller compares changing rate CTcd with changing-rate threshold CT. Thus, current detector 4 is configured to detect object current ID in each of plural detection periods PTab, PTbc, and PTcd. Current detector 4 is configured to detect plural values IDb and IDc of object current ID at different timings Tb and Tc in detection period PTbc, and to detect plural values IDc and IDd of object current ID at different timings Tc and Td in detection period PTcd. Controller 5 is configured to obtain changing rate CTbc based on the plural values IDb and IDc of object current ID and to obtain changing rate CTcd based on the plural values IDc and IDd. The plural detection periods PTab, PTbc, and PTcd may have lengths ΔT identical to one another, or may have lengths different from one another.

In steady period PT0 from timing T0 to timing T1, in a steady state, object current ID does not substantially change. Or, the fluctuation of object current ID in steady period PT0 is significantly smaller than the change of object current ID when an abnormal current, such as a short-circuit current, flows. Therefore, changing rate CTab becomes about zero. Accordingly, from the result of comparison of changing rate CTab with changing-rate threshold CT, controller 5 determines that changing rate CTab is smaller than changing-rate CT. Then, controller 5 does not transmit cutoff signal SG1 or cutoff signal SG2 but allows the steady state to continue. Thus, controller 5 causes switch 2S of relay unit 2 to be in the connecting state and causes cutoff unit 3 to be in the connecting state if controller 5 determines that changing rate CTab is not greater than changing-rate CT.

Object current ID in steady period PT0 will be detailed below. The fluctuation of the pulsating flow of object current ID from a local maximum value thereof to a local minimum value thereof in steady value Ic is much smaller than overcurrent limit IT. The fluctuation of object current ID occurs more slowly than the current fluctuation generated due to a short-circuit current, as described above. For this reason, changing-rate threshold CT utilized by controller 5 in performing comparison and determination may be set to an increasing rate of the object current from the local maximum value to the local minimum value, which is the amount of change per unit time, of the pulsating flow that normally occurs in steady value Ic. Alternatively, changing-rate threshold CT may be set to an increase rate that is the changing rate per unit time of steady value Ic in a short time in which a possible local maximum value and a possible local minimum value of steady value Ic may appear.

Alternatively, changing-rate threshold CT may be set to a value with a large allowance, the vale being obtained by multiplying the increase rate which is the amount of change per unit time by a constant greater than 1. In other words, changing-rate threshold CT is determined based on an increase rate that is the amount of change per unit time at the time when object current ID increases most steeply in the case where the vehicle operates in a normal condition. This configuration allows controller 5 to precisely and easily determine a steady state and an abnormal state in which a short-circuit occurs, which will be described below.

Changing-rate CT may be previously stored in a memory or the like of controller 5 as a predetermined value. Alternatively, changing-rate threshold CT may be updated at appropriate timings from the value previously stored in a memory or the like of controller 5 based on the fluctuation of object current ID in a steady state.

Figure 4:
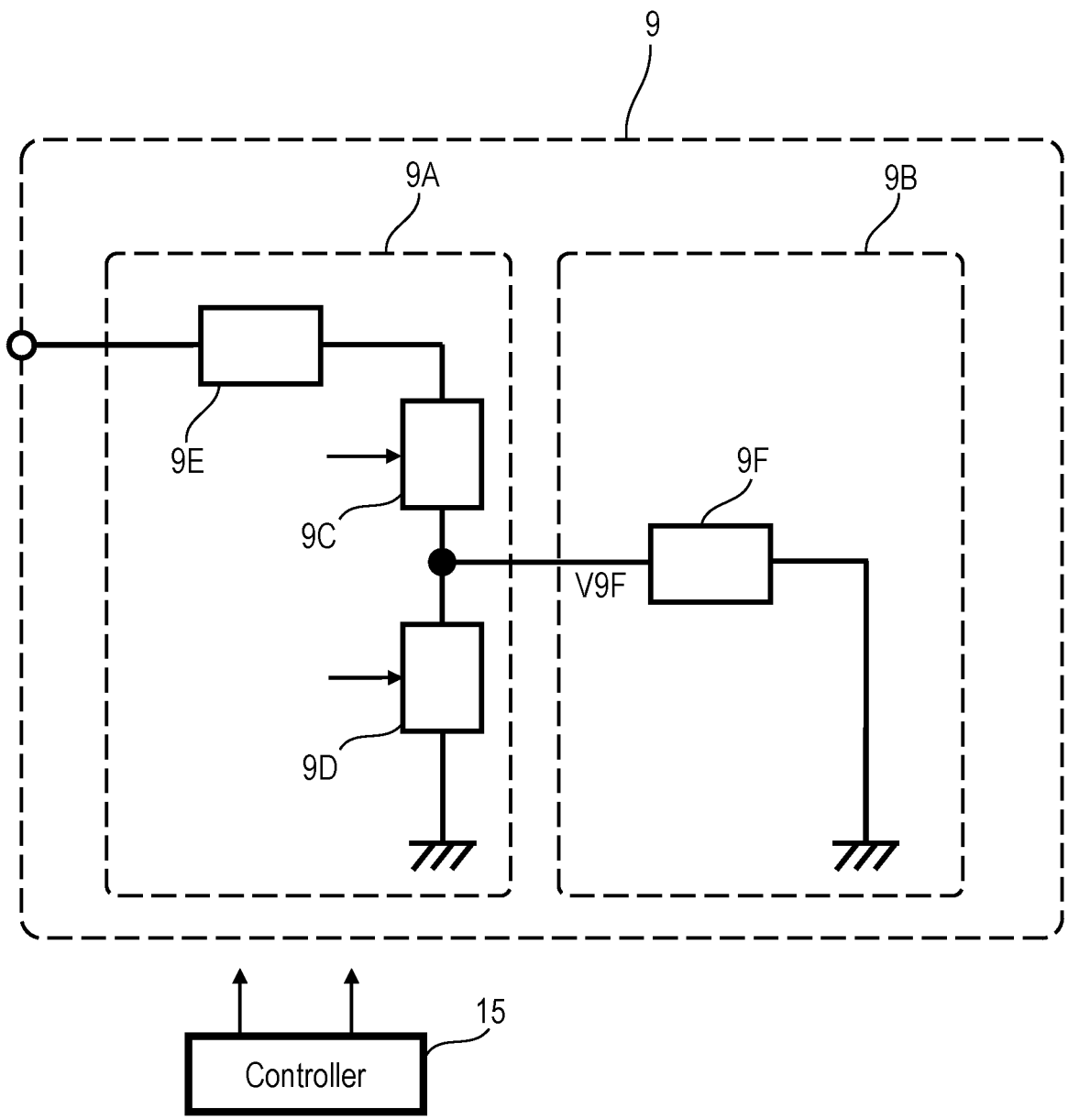
FIG. 4 is a circuit block diagram of a driving load on the vehicle having the power cutoff device in accordance with the embodiment mounted thereto.
Figure 5:
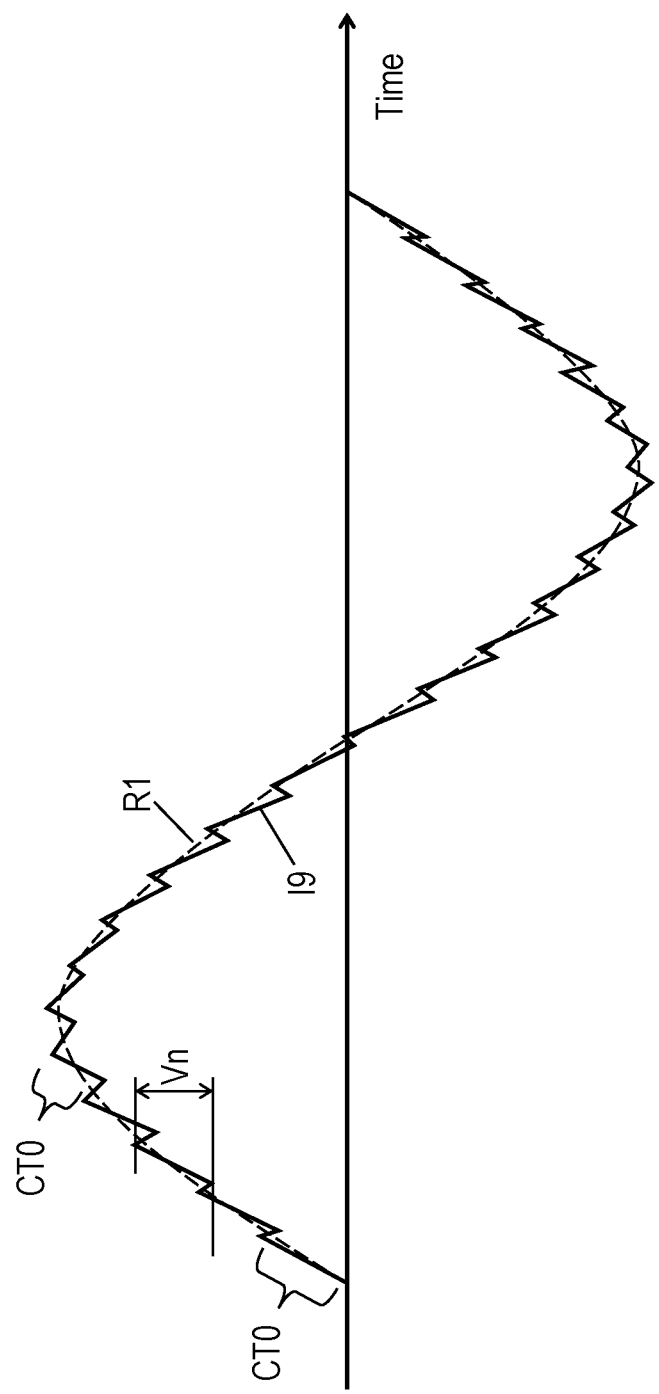
FIG. 5 illustrates a current of the driving load of the vehicle having the power cutoff device in accordance with the embodiment mounted thereto.

A determination of changing-rate threshold CT will be described below. FIG. 4 is a block diagram of driving load 9 of vehicle 6 having power cutoff device 1 mounted thereto. FIG. 5 shows current I9 flowing through driving load 9. As described above, when vehicle 6 utilizes electric power for propulsion driving, a DC voltage is applied from high voltage battery 8 to driving load 9 through power cutoff device 1. Then, power converter 9A converts the DC voltage of high voltage battery 8 into alternating-current (AC) voltage V9F which drives driving motor 9B.

Power converter 9A includes upper arm switch 9C connected to a higher potential side and lower arm switch 9D connected to a lower potential side for power conversion. Power converter 9A further includes inductive component 9E existing in a conductor of power converter 9A. For convenience in illustration, inductive component 9E is described as a component with a lumped constant. Exactly speaking, inductive component 9E is distributed over all of conductor parts including power cutoff device 1, such as conductor part 8A connecting power cutoff device 1 to high voltage battery 8, conductive path 14, and other conductor parts. In addition, driving motor 9B is connected to node 9J between upper arm switch 9C and lower arm switch 9D. Wound-wire part 9F of driving motor 9B is connected as a load in circuitry.

AC voltage V9F supplied from power converter 9A to driving motor 9B does not actually exhibit smooth sine wave R1 shown in FIG. 5, but exhibits an actual waveform with a continuous pulsation with repetitive rises and falls around sine wave R1. The rising period and the falling period in the pulsation are determined by the ratio of the on-time to the off-time of each of upper arm switch 9C and lower arm switch 9D. The on-time and the off-time of each of upper arm switch 9C and lower arm switch 9D are controlled according to, for example, a pulse width modulation (PWM) signal supplied from drive controller 15 installed to vehicle 6.

When electric power is supplied properly from power converter 9A to driving motor 9B and the pulsating flow indicated by the solid line is presented as the current waveform, changing rate CT0 that is the slope of a rising period is expressed as $CT0 = di/dt = V/L1$, where V is a voltage of high voltage battery 8 and L1 is the total of inductances of wound-wire part 9F and inductive component 9E. The inductance of wound-wire part 9F is 10 mH level while the inductance of inductive component 9E is 10 μH level. Inductive component 9E is thus negligible in the calculation. As a result, the slope of the current detected in the rising period while electric power is supplied properly from power converter 9A to driving motor 9B, in other words, the increase rate of the current that can be detected, i.e., the value of increase rate CT0 is about $V/L1 = 0.05$ A/μsec.

In contrast to the normal condition described above, when electric power is not supplied from power converter 9A to the driving motor 9B but, for example, a short-circuit occurs in conductive path 14, the current increases rapidly due to the short-circuit. The changing rate CT1 which is the slope of the current increase at this moment is expressed as CT1=di/dt=V/L2, where V is the voltage of high voltage battery 8 and L2 is the inductance of inductive component 9E. Since the inductance of inductive component 9E is 10 µH level, the increase rate that is the slope of the current flowing through power converter 9A and power cutoff device 1 in the rising period, i.e., the value of changing rate CT1, is about V/L2=50 A/µsec.

Thus, a difference at the level of 10 to the third power arises between the case in which power is properly supplied to driving load 9 and the case in which a short-circuit current occurs. Accordingly, changing-rate threshold CT may be determined based on changing rate CT0 (=V/L1) that is detected during the normal operation. In other words, changing-rate threshold CT may be determined based on changing rate CT0 (=V/L1) that is detected while electric power is supplied to driving load 9.

Alternatively, changing-rate threshold CT may be determined based on changing rate CT1 (=V/L1) during an abnormal condition, which assumes an emergency, such as a short-circuit accident. In other words, changing-rate threshold CT may be determined based on changing rate CT1 (=V/L1) that is detected while electric power is supplied almost only to inductive component 9E.

Thus, changing-rate threshold CT may be set to a value within a wide range from changing rate CT0 (=V/L1) to changing rate CT1 (=V/L2). For example, in order to prevent the sensitivity to a short-circuit from being excessively high so as not to cause erroneous determinations, changing-rate threshold CT may be set to about one-tenth of changing rate CT1 in the case where only inductive component 9E is the load, about 5 A/µpec in the case of the above-described example. Alternatively, voltage V1 may be set to about 60 V as an exemplary value which is considered as the upper limit DC voltage which does not adversely affect human bodies in a short time, and changing-rate threshold CT may be set to a value obtained as V1/L2. The above-described example assumes the inductance of inductive component 9E to be 10 µH for convenience in calculation, the inductance is of course preferably set to an appropriate value. In other words, changing-rate threshold CT may be determined based on the inductance of inductive component 9E.

Current detector 4 is preferably connected between relay unit 2 and input terminal 10. This configuration broadens a target area in which a short-circuit may occur, and improves the operation reliability of power cutoff device 1.

The description returns to a discussion of operations of power cutoff device 1 with reference to FIG. 3. Next, if driving load 9 or conductive path 14 causes a short-circuit or a grounded fault at timing T1 for some reason such as a collision accident of vehicle 6, object current ID continuously increase rapidly from steady value Ic to abnormal current Ia at a linear slope. In this case, object current ID changes from value IDb at timing Tb to value IDc at timing Tc. In other words, object current ID significantly increases from timing Tb, which is in a steady state, to timing Tc, which is in an abnormal state. Then, similarly to the foregoing, the amount of change of value IDb of object current ID at timing Tc from value IDc detected at timing Tc is calculated and converted into changing rate CTbc (=(IDc−IDb)/ΔT), which is the amount of change per unit time. Then, controller 5 compares changing rate CTbc with changing-rate threshold CT.

As illustrated in FIG. 3, the slope of the double-dotted dash line denoting changing rate CTbc is greater than the dashed line denoting changing-rate threshold CT. Controller 5 thus determines that changing rate CTbc is greater than changing-rate threshold CT. Then, controller 5 transmits cutoff signal SG1 to cutoff unit 3 and transmits cutoff signal SG2 to relay unit 2. Upon cutoff unit 3 receiving cutoff signal SG1, breaker 3A is switched from the connecting state to the irreversible cutoff state. Upon relay unit 2 receiving cutoff signal SG2, switch 2S is switched from the connecting state to the cutoff state. Referring to FIG. 3, relay unit 2 and cutoff unit 3 is switched to the cutoff state at timing T2 at which time power cutoff device 1 cuts off the discharge path from high voltage battery 8. For convenience in illustration, there is a time difference to timing T2 from timing Tc, at which it is detected that object current ID has changed to abnormal current Ia and that the changing rate of object current ID has turned to be greater than changing-rate threshold CT. However, timing Tc may be substantially simultaneous to timing T2. Strictly speaking, timing T2 is after timing Tc due to a processing time of controller 5 and the cutoff completion speed of cutoff unit 3.

Unless controller 5 determines that changing rate CTbc is greater than changing-rate threshold CT, controller 5 transmits neither cutoff signal SG1 nor cutoff signal SG2.

The operations described above allow controller 5 to determine that object current ID later becomes a large value resulting in an overcurrent state, at an early stage of the transition period in which object current ID flowing through relay unit 2 and cutoff unit 3 changes from a permissible value to a large value, that is, at an early stage in which the value of object current ID is small. Before object current ID becomes a large value, relay unit 2 and cutoff unit 3 are switched from the connecting state to the cutoff state.

This configuration allows relay unit 2 and cutoff unit 3 to be in the cutoff state at a stage before object current ID at relay unit 2 reaches an excessively large value, thus preventing the occurrence of an arc produced at a contact of switch 2S of relay unit 2 and the occurrence of an incomplete cutoff state resulting from the occurrence of the arc. Since object current ID is cut off before reaching a large value, short-circuit withstand current IS nay not necessarily set to be a large value in order to ensure sufficient operation reliability of relay unit 2. Accordingly, the size of relay unit 2 may not necessarily be increased, and reduces the size of power cutoff device 1 accordingly.

FIG. 3 shows object current ID1 of the comparative example of the power cutoff device which is configured to detect that object current ID1 exceeds overcurrent limit IT, and then, cause the cutoff unit to be in the cutoff state. For object current ID1, object current ID1 is detected to exceed overcurrent limit IT and the cutoff operation of the cutoff unit is started at timing Te, and the cutoff is completed at timing T3. In this case, object current ID1 exceeds overcurrent limit IT and becomes close to short-circuit withstand current IS at timing Tz. Therefore, in order to ensure sufficient operation reliability of relay unit 2, it is necessary to set short-circuit withstand current IS to a large value, and to increase the size of relay unit 2 accordingly.

In contrast, power cutoff device 1 of this example predicts and determines at timing Td that overcurrent of object current ID occurs at a time later than timing Td without detecting that object current ID reaches overcurrent limit IT. Since current detector 4 and controller 5 detect and determine that changing rate CTbc of object current ID becomes greater than changing-rate threshold CT, controller 5 is able to determine, at timing Td before timing Tz, that object current ID is going to exceed overcurrent limit IT at a time after timing Td. Therefore, in addition to the previously-mentioned advantage of size reduction of power cutoff device 1, it is possible to significantly reduce the length of time from timing T1, at which abnormality occurs, to timing T2, at which the cutoff competes, in comparison with the comparative example of the power cutoff device, ensuring safety of vehicle 6 in a short time.

When controller 5 transmits cutoff signals SG1 and SG2 to relay unit 2 and cutoff unit 3, cutoff unit 3 may be preferably switched from the connecting state to the irreversible cutoff state at first, and then, relay unit 2 is switched from the connecting state to the cutoff state. Cutoff signals SG1 and SG2 may be transmitted simultaneously, or cutoff signal SG1 may be transmitted before cutoff signal SG2 is transmitted. In addition, breaker 3A of cutoff unit 3 may be preferably implemented by an active fuse, such as a pyro igniter, which has a faster cutoff speed than relay unit 2.

When cutoff unit 3 is cut off earlier than relay unit 2 in response to cutoff signal SG1, the DC resistance between input terminal 10 and output terminal 11 of power cutoff device 1 increases and the current value decreases even if an arc discharge occurs in cutoff unit 3 at the time when cutoff unit 3 is cut off. Then, after the current value is reduced, relay unit 2 is cut off. For this reason, even when relay unit 2 is implemented by electromagnetic relay 2A including switch 2S having a mechanical contact, arc discharge is prevented from occurring at the time of opening the mechanical contact.

This further prevents the arc occurring at a contact of relay unit 2 and the occurrence of an incomplete cutoff state resulting from the occurrence of the arc. Therefore, it is unnecessary to set short-circuit withstand current IS to be a large value in order to ensure sufficient operation reliability of relay unit 2. Accordingly, it is unnecessary to increase the size of relay unit 2, and as a result, it becomes possible to reduce the size of power cutoff device 1. Further, the operation reliability of power cutoff device 1 improves.

Figure 6:
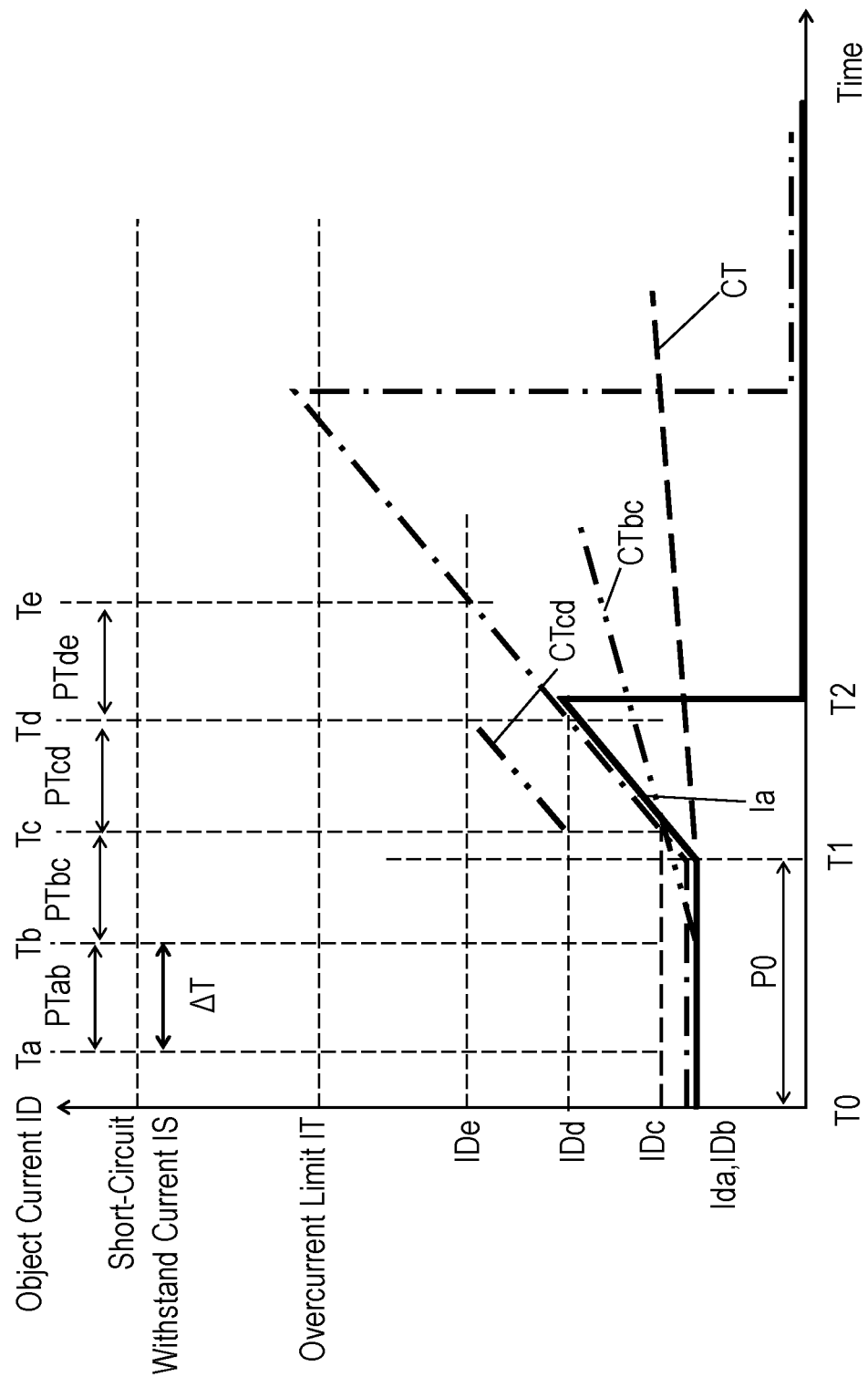
FIG. 6 is another operation characteristic diagram of the power cutoff device in accordance with the embodiment.

FIG. 6 shows other operation characteristics of power cutoff device 1 in accordance with the embodiment. In FIG. 6, items identical to those of FIG. 3 are denoted by the same reference numerals. For the determination of occurrence of abnormal current Ia and the determination of an overcurrent state based on the detection of abnormal current Ia, changing rate CTcd of object current ID may be utilized in addition to changing rate CTbc described above. In the operation shown in FIG. 3, controller 5 determines that changing rate CTbc of object current ID in detection period PTbc from timing Tb to timing Tc becomes greater than changing-rate threshold CT, and thereby, determines that object current ID is going to be a large value resulting in an overcurrent state later.

In the operation shown in FIG. 6, current detector 4 detects value IDd of object current ID at timing Td. Controller 5 determines that changing rate CTbc (=(IDc−IDb)/ΔT) over detection period PTbc becomes greater than changing-rate threshold CT, and determines continuously with the determination for detection period PTbc that changing rate CTbc (=(IDc−IDb)/ΔT) of object current ID over detection period PTcd from timing Tc to timing Td, which follows detection period PTbc, is greater than changing-rate threshold CT. Thereby, controller 5 determines that object current ID is going to be a large value resulting in an overcurrent state later. Then, when controller 5 determines successively that object current ID is going to be a large value resulting in an overcurrent state later, controller 5 transmits cutoff signal SG1 and cutoff signal SG2. Then, at timing T2 immediately after timing Td, relay unit 2 is switched from the connecting state to the cutoff state and cutoff unit 3 is switched from the connecting state to the irreversible cutoff state, so that power cutoff device 1 cuts off the discharge path from high voltage battery 8.

In this operation, controller 5 causes switch 2S of relay unit 2 to be in the connecting state and maintains cutoff unit 3 in the connecting state if determining that at least one of changing rate CTbc and changing rate and CTcd is not greater than changing-rate threshold CT.

This operation prevents erroneous determinations resulting from accidental detection errors and calculation errors, and improves operation reliability of power cutoff device 1. Controller 5 determines whether or not changing rate CTbc over detection period PTbc and changing rate CTcd over detection period PTcd which is consecutive to detection period PTbc are greater than changing-rate threshold CT. In power cutoff device 1 according to the embodiment, current detector 4 may detect value IDe of object current ID, so that controller 5 may utilize changing rate CTde (=(IDe−IDd)/ΔT) over detection period PTde which is from timing Td to timing Td and is consecutive to detection period PTcd, and compares changing rate CTde with changing-rate threshold CT to make a determination. Controller 5 may use the rates of change over further subsequent detection periods to compare them with changing-rate threshold CT to make a determination. Controller 5 may successively determine that all the rates of change over plural detection periods are greater than changing-rate threshold CT, and thereby, controller 5 may determine that object current ID is going to be a large value resulting in an overcurrent state later, and may switch relay unit 2 and cutoff unit 3 to the cutoff state.

Still another operation of power cutoff device 1 in accordance with the embodiment will be described below. As shown in FIG. 4, controller 5 determines that changing rate CTbc (=(IDc−IDb)/ΔT) over detection period PTbc is greater than changing-rate threshold CT and also determines that changing rate CTcd (=(IDd−IDc)/ΔT) of object current ID over detection period PTcd consecutive to detection period PTbc is greater than changing-rate threshold CT. Thereby, controller 5 determines that object current ID is going to be a large value resulting in an overcurrent state later. Then, when controller 5 determines successively that object current ID is going to be a large value resulting in an overcurrent state later, controller 5 transmits cutoff signal SG1 and cutoff signal SG2. In response to the signals, relay unit 2 is switched to the cutoff state, and cutoff unit 3 is switched to the irreversible cutoff state.

Controller 5 causes relay unit 2 to be in the connecting state and causes cutoff unit 3 to be in the connecting state if controller 5 determines that changing rate CTbc is not greater than changing-rate threshold CT or determines that changing rate CTcd is not greater than changing rate CTbc.

As illustrated in FIGS. 3 and 6, both of rates of change CTbc and CTcd are greater than changing-rate threshold CT, as shown as the slope of the linear lines. Changing rate CTcd may be obtained as (IDc−IDb)/ΔT by detection of object current ID and calculation performed by controller 5. Timing T1 at which object current ID starts to rapidly increase from steady value Ic to abnormal current Ia as mentioned earlier does not necessarily agree with timings Ta to Te, . . . at which object current ID is detected for each predetermined period ΔT. On the other hand, timing Tc that is the starting point of the current value for performing calculation agrees with timing Tc that is one of the detection timings that are set for each predetermined period ΔT.

Therefore, generally, changing rate CTbc is smaller than changing rate CTcd even when object current ID is properly detected and calculation is properly carried out by controller 5. In other words, the fact that changing rate CTbc is greater than changing rate CTcd may indicate that an erroneous determination occurs due to an accidental detection error or a calculation error. Accordingly, controller 5 may use the fact that changing rate CTbc is smaller than changing rate CTcd as a criterion to determine that object current ID is going to be a large value resulting in an overcurrent state later. This operation prevents erroneous determinations resulting from accidental detection errors and calculation errors, and increases the operation reliability of power cutoff device 1.

Controller 5 utilizes changing rate CTbc over detection period PTbc and changing rate CTcd over detection period PTcd consecutive to detection period PTbc to make the determination. Controller 5 may utilize changing rate CTde over detection period PTde consecutive to detection period PTcd, or the rates of change over further subsequent detection periods to make the determination. That is, controller 5 may successively determine that changing rate CTde and the subsequent rates of change over plural subsequent detection periods are greater than changing rate CTbc, and thereby, controller 5 may determine that object current ID is going to be a large value resulting in an overcurrent state, and transmit cutoff signals SG1 and SG2 so as to switch relay unit 2 from the connecting state to the cutoff state and to switch cutoff unit 3 from the connecting state to the irreversible cutoff state.

In addition, it is possible to execute both the earlier-described operation in which controller 5 determines that object current ID is going to be a large value resulting in an overcurrent state later based on the fact that changing rate CTbc and changing rate CTcd successively become greater than changing-rate threshold CT, and the operation in which controller 5 determines that object current ID is going to be a large value resulting in an overcurrent state later based on the fact that changing rate CTbc is smaller than changing rate CTcd. That is, if changing rate CTbc and changing rate CTcd are greater than changing-rate threshold CT and also changing rate CTbc is smaller than changing rate CTcd, controller 5 may transmit cutoff signals SG1 and SG2, switch relay unit 2 from the connecting state to the cutoff state, and switch cutoff unit 3 from the connecting state to the irreversible cutoff state. In this case, if changing rate CTbc and changing rate CTcd are not greater than changing-rate threshold CT or changing rate CTbc is not smaller than changing rate CTcd, controller 5 does not transmit cutoff signals SG1 and SG2 and maintains relay unit 2 and cutoff unit 3 in the connecting state. This configuration prevents erroneous determinations resulting from accidental detection errors and calculation errors, consequently improving the operation reliability of power cutoff device 1.

REFERENCE MARKS IN THE DRAWINGS 1 power cutoff device
2 relay unit
2A electromagnetic relay
2B relay circuit
3 cutoff unit
3A breaker
3B cutoff circuit
4 current detector
5 controller
6 vehicle
7 vehicle body
8 high voltage battery
8A conductor part
9 driving load
9A power converter
9B driving motor
9C upper arm switch
9D lower arm switch
9E inductive component
9F wound-wire part
9J connection point
10 input terminal
11 output terminal
12 junction box
13 starter unit
14 conductive path
15 driving controller

The invention claimed is:

1. A power cutoff device comprising:
   a relay unit including a switch which is configured to be in a connecting state in which the switch is electrically conductive and a cutoff state in which the switch is electrically non-conductive;
   a cutoff unit connected in series to the switch of the relay unit, the cutoff unit having a connecting state in which the cutoff unit is electrically conductive and an irreversible cutoff state in which the cutoff unit is electrically conductive irreversibly;
   a current detector configured to detect, in each of a plurality of detection periods including a first detection period and a second detection period after the first detection period, an object current flowing through the cutoff unit; and
   a controller configured to control the relay unit and the cutoff unit, wherein the controller is configured to:
   obtain a first changing rate of the object current with respect to time in the first detection period;
   obtain a second changing rate of the object current with respect to time in the second detection period;
   cause the switch of the relay unit to be in the connecting state and cause the cutoff unit to be in the connecting state if determining that the first changing rate is not greater than a changing-rate threshold; and
   cause the relay unit to be in the cutoff state and cause the cutoff unit to be in the irreversible cutoff state if determining that the first changing rate and the second changing rate are greater than the changing-rate threshold.

2. The power cutoff device of claim 1, wherein the controller is configured to cause the relay unit to be in the cutoff state and cause the cutoff unit to be in the irreversible cutoff state before the object current reaches a predetermined overcurrent limit of the relay unit if determining that the first changing rate and the second changing rate are greater than the changing-rate threshold.

3. The power cutoff device of claim 1, wherein
   the controller is configured to previously store the changing-rate threshold therein, and
   the changing-rate threshold is determined based on an increasing rate of the object current increasing from a local minimum value of the object current to a local maximum value of the object current with respect to time in a case that the object current fluctuates within a range lower than an overcurrent limit.

4. The power cutoff device of claim 1, wherein
   the controller is configured to previously store the changing-rate threshold, and
   the changing-rate threshold is determined based on a fluctuation rate of the object current when the object current is smaller than an overcurrent limit and fluctuates while power is supplied to a driving load.

5. The power cutoff device of claim 1, wherein the controller is configured to first cause the cutoff unit to switch from the connecting state to the irreversible cutoff state, and then subsequently, cause the relay unit to switch from the connecting state to the cutoff state if determining that the first changing rate and the second changing rate are greater than the changing-rate threshold.

6. The power cutoff device of claim 1, wherein the controller is configured to cause the switch of the relay unit to be in the connecting state and cause the cutoff unit to be in the connecting state if determining that at least one of the first changing rate and the second changing rate is not greater than the changing-rate threshold.

7. A power cutoff device comprising:
a relay unit including a switch which is configured to be in a connecting state in which the switch is electrically conductive and a cutoff state in which the switch is electrically non-conductive;
a cutoff unit connected in series to the switch of the relay unit, the cutoff unit having a connecting state in which the cutoff unit is electrically conductive and an irreversible cutoff state in which the cutoff unit is electrically conductive irreversibly;
a current detector configured to detect, in each of a plurality of detection periods including a first detection period and a second detection period after the first detection period, an object current flowing through the cutoff unit; and
a controller configured to control the relay unit and the cutoff unit, wherein the controller is configured to:
obtain a first changing rate of the object current with respect to time in the second detection period;
obtain a second changing rate of the object current with respect to time in a second detection period out of the plurality of detection periods after the first detection period;
cause the switch of the relay unit to be in the connecting state and cause the cutoff unit to be in the connecting state if determining that the first changing rate is not greater than a changing-rate threshold; and
cause the relay unit to be in the cutoff state and cause the cutoff unit to be in the irreversible cutoff state if determining that the first changing rate is greater than the changing-rate threshold and that the second changing rate is greater than the first changing rate.

8. The power cutoff device of claim 7, wherein the controller is configured to cause the relay unit to be in the connecting state and cause the cutoff unit to be in the connecting state if determining that the first changing rate is not greater than the changing-rate threshold or if determining that the second changing rate is not greater than the first changing rate.

9. The power cutoff device of claim 1, wherein the second detection period is consecutive to the first detection period.

10. The power cutoff device of claim 1, wherein
the current detector is configured to:
detect a plurality of first values of the object current at a plurality of timings different from one another in the first detection period; and
detect a plurality of second values of the object current at a plurality of timings different from one another in the second detection period, and the controller is configured to:
obtain the first changing rate based on the plurality of first values of the object current; and
obtain the second changing rate based on the plurality of second values of the object current.

11. The power cutoff device of claim 1, wherein the plurality of detection periods are consecutive to one another.

12. The power cutoff device of claim 1, wherein the plurality of detection periods have lengths equal to one another.

13. The power cutoff device of claim 7, wherein the second detection period is consecutive to the first detection period.

14. The power cutoff device of claim 7, wherein
the current detector is configured to:
detect a plurality of first values of the object current at a plurality of timings different from one another in the first detection period; and
detect a plurality of second values of the object current at a plurality of timings different from one another in the second detection period, and
the controller is configured to:
obtain the first changing rate based on the plurality of first values of the object current; and
obtain the second changing rate based on the plurality of second values of the object current.

15. The power cutoff device of claim 7, wherein the controller is configured to cause the relay unit to be in the cutoff state and cause the cutoff unit to be in the irreversible cutoff state before the object current reaches a predetermined overcurrent limit of the relay unit if determining that the first changing rate is greater than the changing-rate threshold and that the second changing rate is greater than the first changing rate.

16. The power cutoff device of claim 7, wherein
the controller is configured to previously store the changing-rate threshold therein, and
the changing-rate threshold is determined based on an increasing rate of the object current increasing from a local minimum value of the object current to a local maximum value of the object current with respect to time in a case that the object current fluctuates within a range lower than an overcurrent limit.

17. The power cutoff device of claim 7, wherein
the controller is configured to previously store the changing-rate threshold, and
the changing-rate threshold is determined based on a fluctuation rate of the object current when the object current is smaller than an overcurrent limit and fluctuates while power is supplied to a driving load.

18. The power cutoff device of claim 1, wherein the controller is configured to first cause the cutoff unit to switch from the connecting state to the irreversible cutoff state, and then subsequently, cause the relay unit to switch from the connecting state to the cutoff state if determining that the first changing rate is greater than the changing-rate threshold and that the second changing rate is greater than the first changing rate.

19. The power cutoff device of claim 7, wherein the plurality of detection periods are consecutive to one another.

20. The power cutoff device of claim 7, wherein the plurality of detection periods have lengths equal to one another.

* * * * *